US011511644B2

(12) United States Patent
Tsurutani et al.

(10) Patent No.: US 11,511,644 B2
(45) Date of Patent: Nov. 29, 2022

(54) LEARNING APPARATUS, LEARNING METHOD, AND PROGRAM

(71) Applicant: HONDA MOTOR CO., LTD., Tokyo (JP)

(72) Inventors: Taisuke Tsurutani, Wako (JP); Taisuke Kurachi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 513 days.

(21) Appl. No.: 16/655,335

(22) Filed: Oct. 17, 2019

(65) Prior Publication Data

US 2020/0130530 A1 Apr. 30, 2020

(30) Foreign Application Priority Data

Oct. 29, 2018 (JP) .............................. JP2018-203208

(51) Int. Cl.
*B60L 58/12* (2019.01)
*G06N 20/00* (2019.01)
*G07C 5/08* (2006.01)

(52) U.S. Cl.
CPC .............. *B60L 58/12* (2019.02); *G06N 20/00* (2019.01); *G07C 5/0825* (2013.01)

(58) Field of Classification Search
None
See application file for complete search history.

(56) References Cited

U.S. PATENT DOCUMENTS

| 2006/0181245 A1* | 8/2006 | Mizuno | G01R 31/367 320/132 |
| 2013/0015860 A1* | 1/2013 | Crombez | B60L 58/13 320/137 |
| 2014/0072950 A1 | 3/2014 | Fu et al. | |

(Continued)

FOREIGN PATENT DOCUMENTS

| CN | 101243325 | 8/2008 |
| CN | 101800340 | 8/2010 |
| CN | 105050855 | 11/2015 |

(Continued)

OTHER PUBLICATIONS

Lee Jung Hwan, Dec. 27, 2018, English Machine Translation_ WO2018235995A1 provided by Patent Translate by EPO and Google (Year: 2018).*

(Continued)

*Primary Examiner* — Peter D Nolan
*Assistant Examiner* — Ashley L Redhead, Jr.
(74) *Attorney, Agent, or Firm* — Amin, Turocy & Watson, LLP

(57) ABSTRACT

A learning apparatus includes: a learning part that performs, based on charging/discharging data indicating at least one of charging and discharging of a secondary battery that supplies electric power for traveling of a vehicle, a capacity learning of the secondary battery and that performs the capacity learning in response to a change amount of a charging rate that is indicated by the charging/discharging data exceeding a threshold value; and a threshold determination part that determines the threshold value based on history information of the learning part performing the capacity learning in a predetermined period.

17 Claims, 7 Drawing Sheets

(56) References Cited

U.S. PATENT DOCUMENTS

2018/0026454 A1* 1/2018 Belkacem-Boussaid .................... H02J 7/34
702/63

FOREIGN PATENT DOCUMENTS

| | | |
|---|---|---|
| CN | 107076803 | 8/2017 |
| CN | 107179512 | 9/2017 |
| JP | 11-285155 | 10/1999 |
| JP | 2007-010370 | 1/2007 |
| JP | 2007-026733 | 2/2007 |
| JP | 2009-162623 | 7/2009 |
| JP | 2013-072862 | 4/2013 |
| JP | 2014-007079 | 1/2014 |
| JP | 2014-178213 | 9/2014 |
| JP | 2015-162991 | 9/2015 |
| JP | 2017-091852 | 5/2017 |
| JP | 2018-013435 | 1/2018 |
| WO | WO-2018235995 A1 * | 12/2018 .............. B60L 53/11 |

OTHER PUBLICATIONS

Chinese Office Action for Chinese Patent Application No. 201910986995.6 dated Sep. 3, 2021.
Japanese Office Action for Japanese Patent Application No. 2018-203208 dated Nov. 24, 2021.

* cited by examiner

| MEASUREMENT TIME | CHARGING RATE | CHARGING/ DISCHARGING CURRENT | LEARNING FLAG |
|---|---|---|---|
| 2018/MM/DD 15:00 | 70% | X1 | 1 |
| 2018/MM/DD 15:01 | 68% | X2 | 0 |
| ⋮ | ⋮ | ⋮ | ⋮ |
| 2018/MM/DD 15:59 | 22% | X60 | 0 |
| 2018/MM/DD 16:00 | 20% | X61 | 2 |
| 2018/MM/DD 16:01 | 21% | X62 | 0 |
| ⋮ | ⋮ | ⋮ | ⋮ |

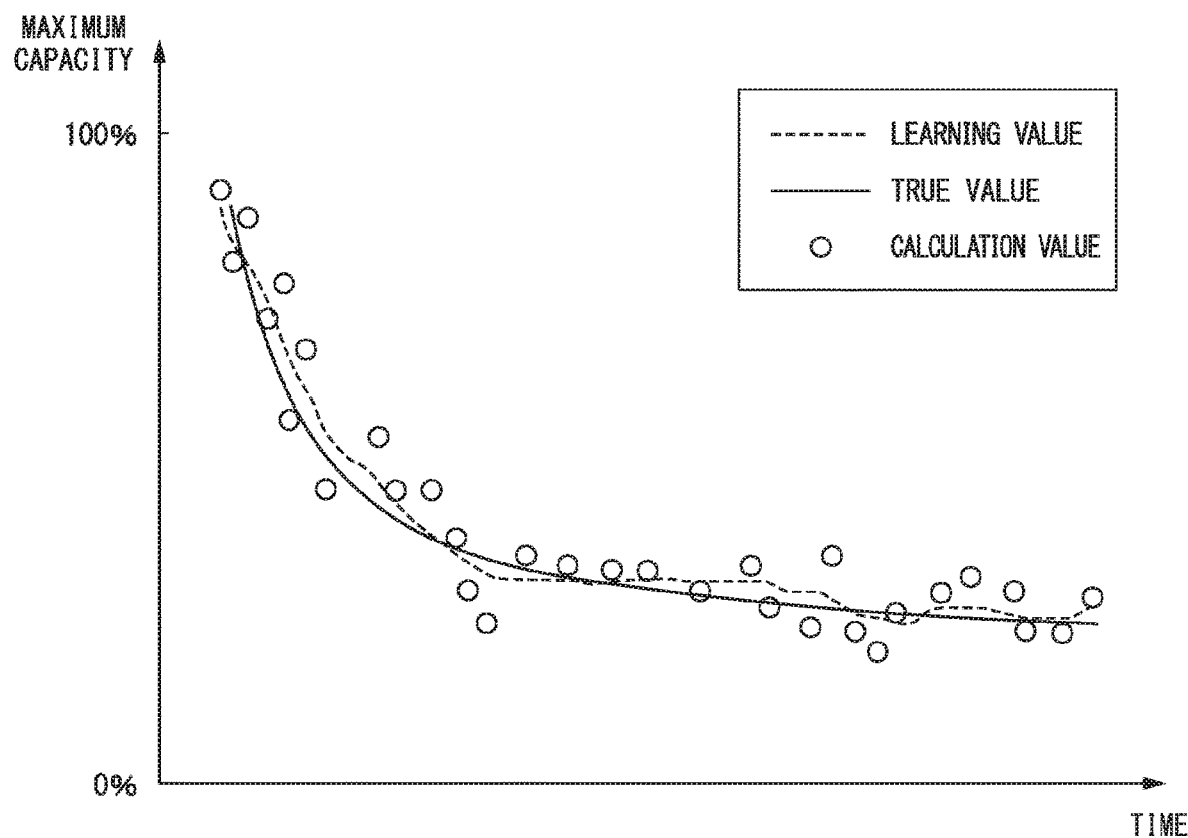

FIG. 9

| LEARNING FREQUENCY | THRESHOLD VALUE | DATA REFLECTION RATE |
|---|---|---|
| 1~5 TIMES | 5% | 0.5 |
| 6~10 TIMES | 10% | 0.3 |
| 11~20 TIMES | 20% | 0.2 |
| ⋮ | ⋮ | ⋮ |

FIG. 10

| SQUARE SUM OF DIFFERENCE CHARGING RATE | THRESHOLD VALUE |
|---|---|
| EQUAL TO OR LESS THAN 500 | 5% |
| EQUAL TO OR LESS THAN 2000 | 10% |
| EQUAL TO OR LESS THAN 5000 | 20% |
| ⋮ | ⋮ |

LEARNING APPARATUS, LEARNING METHOD, AND PROGRAM

CROSS-REFERENCE TO RELATED APPLICATION

Priority is claimed on Japanese Patent Application No. 2018-203208, filed on Oct. 29, 2018, the contents of which are incorporated herein by reference.

BACKGROUND

Field of the Invention

The present invention relates to a learning apparatus, a learning method, and a program.

Background

In recent years, an electric vehicle that uses electricity and a hybrid vehicle that uses electricity and an engine have been developed. A motor mounted on such vehicles is driven by electric power supplied from a secondary battery such as a battery. The vehicles have a function of calculating a full-charge capacity of the secondary battery.

The full-charge capacity of the secondary battery is degraded as charging/discharging is repeated. Therefore, there is a technique in which a degradation degree of the secondary battery is determined, and the degradation of the secondary battery is prevented (for example, refer to Japanese Unexamined Patent Application, First Publication No. 2015-162991). The degradation degree of the secondary battery is obtained, for example, on the basis of an integration value of a discharging amount, a voltage decrease amount, and the like of the secondary battery calculated by a current value, a voltage value, a temperature, and the like of the secondary battery.

SUMMARY

In order to calculate the full-charge capacity of a secondary battery, it is desirable that there be two points of data having a larger change amount of a charging rate (SOC; State Of Charge) than a threshold value. However, when choosing data using a stationary threshold value, there may be cases in which a learning opportunity is reduced.

An object of an aspect of the present invention is to provide a learning apparatus, a learning method, and a program capable of fairly ensuring a learning opportunity of a degradation state of a secondary battery.

A learning apparatus, a learning method, and a program according to aspects of the present invention employ the following configurations.

(1): An aspect of the present invention is a learning apparatus including: a learning part that performs, based on charging/discharging data indicating at least one of charging and discharging of a secondary battery that supplies electric power for traveling of a vehicle, a capacity learning of the secondary battery and that performs the capacity learning in response to a change amount of a charging rate that is indicated by the charging/discharging data exceeding a threshold value; and a threshold determination part that counts the number of times the learning part performs the capacity learning in a predetermined period and that determines the threshold value based on the number of times.

(2): In the learning apparatus according to the aspect (1) described above, the threshold determination part may make the threshold value smaller as the number of times becomes smaller.

(3): The learning apparatus according to the aspect (1) or (2) described above may further include: a determination part that determines whether the charging/discharging data is used as learning data of the capacity learning based on the threshold value, wherein the learning part may perform the capacity learning using the learning data based on a determination result of the determination part.

(4): The learning apparatus according to the aspect (3) described above may further include: a display control part that allows a display part to display a degradation degree of the secondary battery based on a result of the capacity learning.

(5): In the learning apparatus according to the aspect (4) described above, the learning part may compare a current maximum capacity indicating a current full-charge capacity of the secondary battery to an initial maximum capacity indicating an initial full-charge capacity of the secondary battery and may calculate a ratio of the full-charge capacity indicating a degradation degree of the current full-charge capacity to the initial maximum capacity.

(6): Another aspect of the present invention is a learning method, by way of one or more computers, including: performing, based on charging/discharging data indicating at least one of charging and discharging of a secondary battery that supplies electric power for traveling of a vehicle, a capacity learning of the secondary battery; performing the capacity learning in response to a change amount of a charging rate that is indicated by the charging/discharging data exceeding a threshold value; counting the number of times the capacity learning is performed in a predetermined period; and determining the threshold value based on the number of times.

(7): Still another aspect of the present invention is a computer-readable non-transitory recording medium including a program causing one or more computers to execute: performing, based on charging/discharging data indicating at least one of charging and discharging of a secondary battery that supplies electric power for traveling of a vehicle, a capacity learning of the secondary battery; performing the capacity learning in response to a change amount of a charging rate that is indicated by the charging/discharging data exceeding a threshold value; counting the number of times the capacity learning is performed in a predetermined period; and determining the threshold value based on the number of times.

According to the aspects (1) to (7), by determining the threshold value on the basis of the number of times of learning, it is possible to fairly ensure the learning opportunity of the degradation state of the secondary battery.

According to the aspects (4) to (5), on the basis of the learning result, it is possible to notify the user of the degradation degree of the secondary battery.

BRIEF DESCRIPTION OF THE DRAWINGS

FIG. 6 is a data table showing an example of the contents of a correspondence table.

FIG. 7 is a view showing a specific example of a degradation state of a full-charge capacity of a battery.

FIG. 9 is a data table showing an example of the contents of the correspondence table according to a modified example.

FIG. 10 is a data table showing an example of the contents of the correspondence table according to the modified example.

DESCRIPTION OF EMBODIMENTS

Hereinafter, a learning apparatus, a learning method, and a program according to an embodiment of the present invention will be described with reference to the drawings.

[Vehicle 10]

Figure 1:
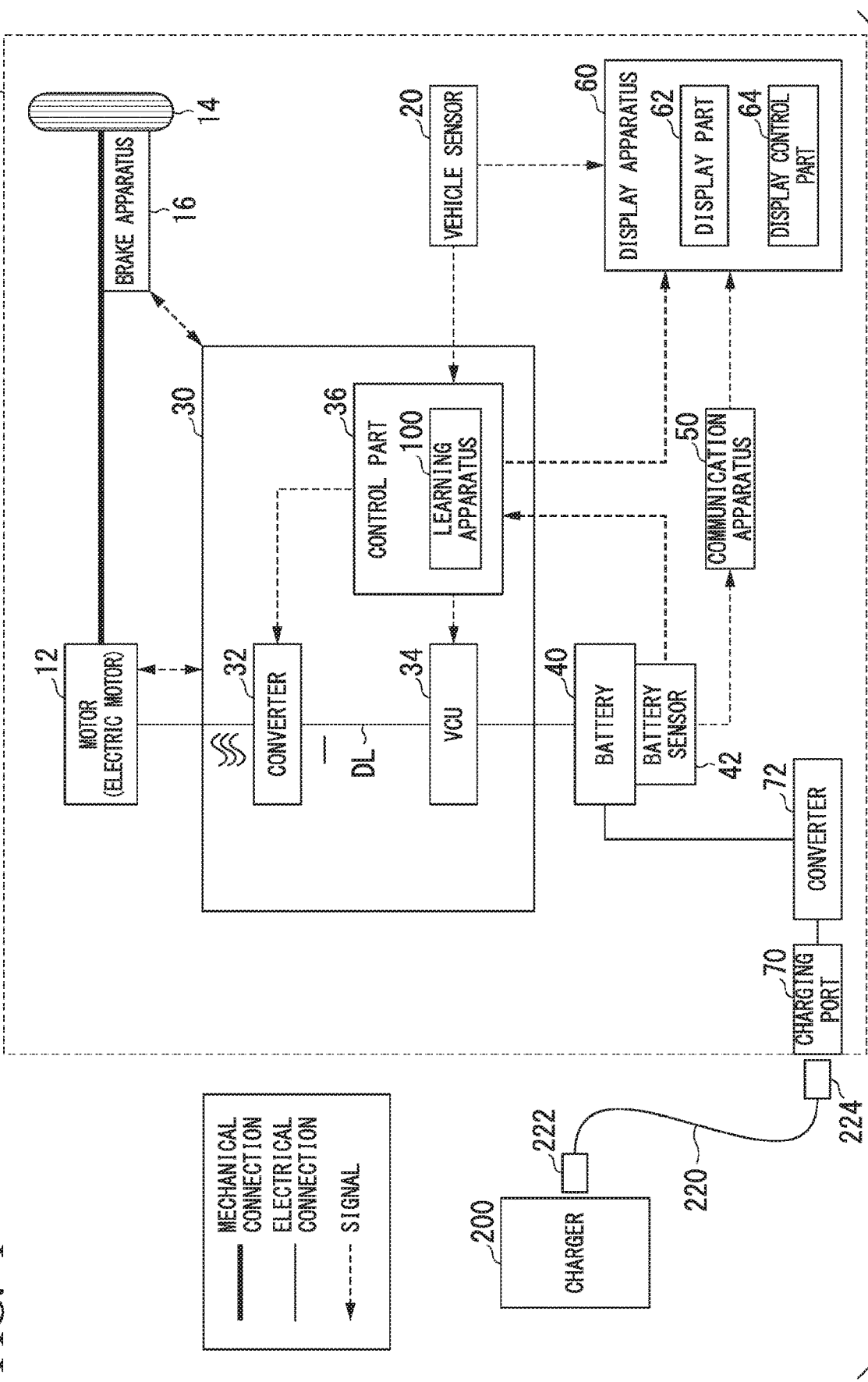
FIG. 1 is a view showing an example of a configuration of a vehicle according to an embodiment.

FIG. 1 is a view showing an example of a configuration of a vehicle 10 according to an embodiment. As shown in FIG. 1, the vehicle 10 includes, for example, a motor 12, a driving wheel 14, a brake apparatus 16, a vehicle sensor 20, a PCU (Power Control Unit) 30, a battery 40, a battery sensor 42 such as a voltage sensor, a current sensor, and a temperature sensor, a communication apparatus 50, a display apparatus 60, a charging port 70, and a converter 72.

The motor 12 is, for example, a three-phase AC electric motor. A rotor of the motor 12 is connected to the driving wheel 14. The motor 12 outputs power to the driving wheel 14 using a supplied electric power. The motor 12 generates electric power using kinetic energy of the vehicle at the time of decelerating the vehicle.

The brake apparatus 16 includes, for example, a brake caliper, a cylinder that transmits a hydraulic pressure to the brake caliper, and an electric motor that generates the hydraulic pressure in the cylinder. The brake apparatus 16 may include, as a backup, a mechanism that transmits the hydraulic pressure generated by an operation on a brake pedal to the cylinder via a master cylinder. The brake apparatus 16 is not limited to the configuration described above and may be an electronic control-type hydraulic brake apparatus that transmits a hydraulic pressure of the master cylinder to the cylinder.

The vehicle sensor 20 includes an acceleration opening degree sensor, a vehicle speed sensor, and a brake depression amount sensor. The acceleration opening degree sensor is attached to an acceleration pedal as an example of an operator that accepts an acceleration command by a driver, detects the amount of operation of the acceleration pedal, and outputs the detected amount of operation to a control part 36 as an acceleration opening degree. The vehicle speed sensor includes, for example, vehicle wheel speed sensors attached to vehicle wheels and a speed calculator, derives a speed of the vehicle (vehicle speed) by combining vehicle wheel speeds detected by the vehicle wheel speed sensors, and outputs the derived speed to the control part 36 and the display apparatus 60. The brake depression amount sensor is attached to the brake pedal. The brake depression amount sensor detects the amount of operation of the brake pedal and outputs the detected amount of operation of the brake pedal to the control part 36 as a brake depression amount.

The PCU 30 includes, for example, a converter 32, a VCU (Voltage Control Unit) 34, and the control part 36. An integrated configuration of such constituent elements as the PCU 30 is merely an example, and such constituent elements may be arranged in a distributed manner.

The converter 32 is, for example, an AC-DC converter. A DC-side terminal of the converter 32 is connected to a DC link DL. The battery 40 is connected via the VCU 34 to the DC link DL. The converter 32 converts an AC generated by the motor 12 into a DC and outputs the DC to the DC link DL.

The VCU 34 is, for example, a DC-DC converter. The VCU 34 increases a voltage of the electric power supplied from the battery 40 and outputs the electric power to the DC link DL.

The control part 36 includes, for example, a motor control part, a brake control part, a battery VCU control part, and a learning apparatus 100. The motor control part, the brake control part, and the battery VCU control part may be replaced by separate control apparatuses which are, for example, a control apparatus such as a motor ECU, a control apparatus such as a brake ECU, and a control apparatus such as a battery ECU. In the present embodiment, the control part 36 includes the learning apparatus 100; however, a center server that is communicable with the vehicle 10 via a network may include the learning apparatus 100.

The motor control part controls the motor 12 on the basis of an output of the vehicle sensor 20. The brake control part controls the brake apparatus 16 on the basis of an output of the vehicle sensor 20. The battery VCU control part calculates an SOC (State Of Charge; hereinafter, also referred to as a "charging rate") of the battery 40 on the basis of an output of the battery sensor 42 attached to the battery 40 and outputs the calculated SOC to the VCU 34 and the display apparatus 60. The VCU 34 increases a voltage of the DC link DL in response to a command from the battery VCU control part. The charging rate is information indicating a point between a full discharge (0%) and a full charge (100%) at which the charge state of the secondary battery at a certain time point is.

The battery 40 is, for example, a secondary battery such as a lithium ion battery. The battery 40 accumulates electric power introduced from a charger 200 provided outside the vehicle 10 and discharges for traveling of the vehicle 10. The battery sensor 42 includes, for example, a current sensor, a voltage sensor, and a temperature sensor. The battery sensor 42 detects, for example, a current value, a voltage value, and a temperature of the battery 40. The battery sensor 42 outputs the detected current value, the detected voltage value, the detected temperature, and the like to the control part 36 and the communication apparatus 50.

The communication apparatus 50 includes a radio module used for connecting to a cellular network or a Wi-Fi network.

The communication apparatus 50 acquires battery usage situation information such as the current value, the voltage value, and the temperature output from the battery sensor 42 and transmits the battery usage situation information to a server such as the center server through a network. The communication apparatus 50 adds battery type information and vehicle type information of the vehicle to the battery usage situation information to be transmitted. The communication apparatus 50 receives information transmitted from the server via the network. The communication apparatus 50 outputs the received information to the display apparatus 60.

The display apparatus 60 includes, for example, a display part 62 and a display control part 64. The display part 62 displays information in accordance with a control by the display control part 64. The display control part 64 allows the display part 62 to display a degradation degree of the battery in accordance with the information output from the control part 36 and the communication apparatus 50. The display control part 64 allows the display part 62 to display a vehicle speed and the like output from the vehicle sensor 20.

The charging port 70 is provided to face the outside of a vehicle body of the vehicle 10. The charging port 70 is connected to the charger 200 via a charging cable 220. The charging cable 220 includes a first plug 222 and a second plug 224. The first plug 222 is connected to the charger 200, and the second plug 224 is connected to the charging port 70. Electricity supplied from the charger 200 is supplied to the charging port 70 via the charging cable 220.

The charging cable 220 includes a signal cable provided on an electric power cable. The signal cable relays a communication between the vehicle 10 and the charger 200. Accordingly, an electric power connector and a signal connector are provided on each of the first plug 222 and the second plug 224.

The converter 72 is provided between the battery 40 and the charging port 70. The converter 72 converts a current introduced from the charger 200 via the charging port 70 which is, for example, an AC current into a DC current. The converter 72 outputs the converted DC current to the battery 40.

Figure 2:
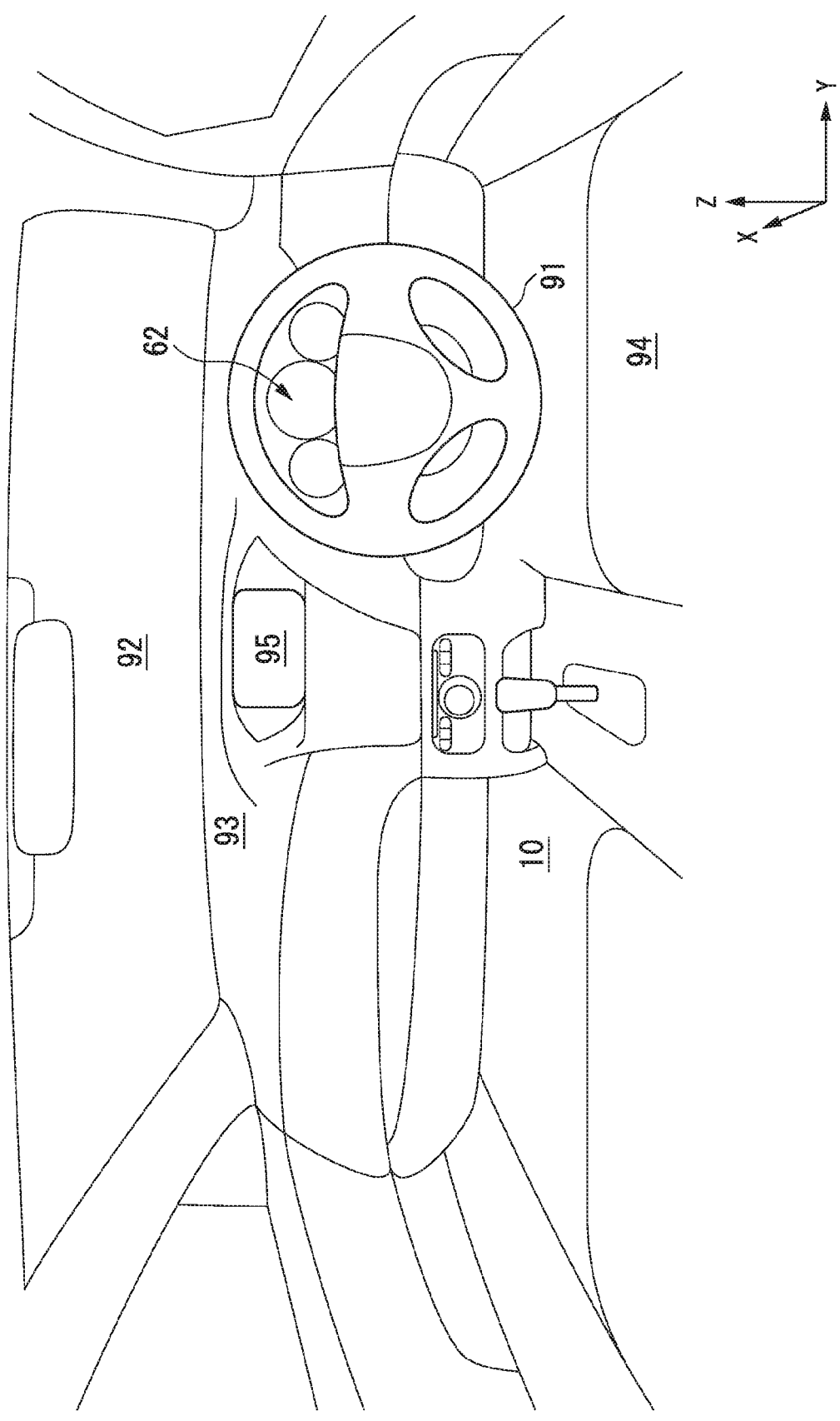
FIG. 2 is a view showing an example of a configuration inside a vehicle room of the vehicle.

FIG. 2 is a view showing an example of a configuration inside a vehicle room of the vehicle 10. As shown in FIG. 2, for example, a steering wheel 91 that controls steering of the vehicle 10, a front windshield 92 that sections the outside of the vehicle and the inside of the vehicle room, and an instrument panel 93 are provided on the vehicle 10. The front windshield 92 is a member having a light transmission property.

The display part 62 of the display apparatus 60 is provided in the vicinity of the front of a driver's seat 94 on the instrument panel 93 inside the vehicle room. The display part 62 is visually recognizable by a driver through a gap in the steering wheel 91 or over the steering wheel 91. A second display apparatus 95 is provided on the middle of the instrument panel 93. The second display apparatus 95, for example, displays an image corresponding to a navigation process performed by a navigation apparatus (not shown) mounted on the vehicle 10 or displays a video or the like of a partner in a video telephone call. The second display apparatus 95 may display a television program, play back a DVD, or display contents such as a downloaded movie.

Figure 3:
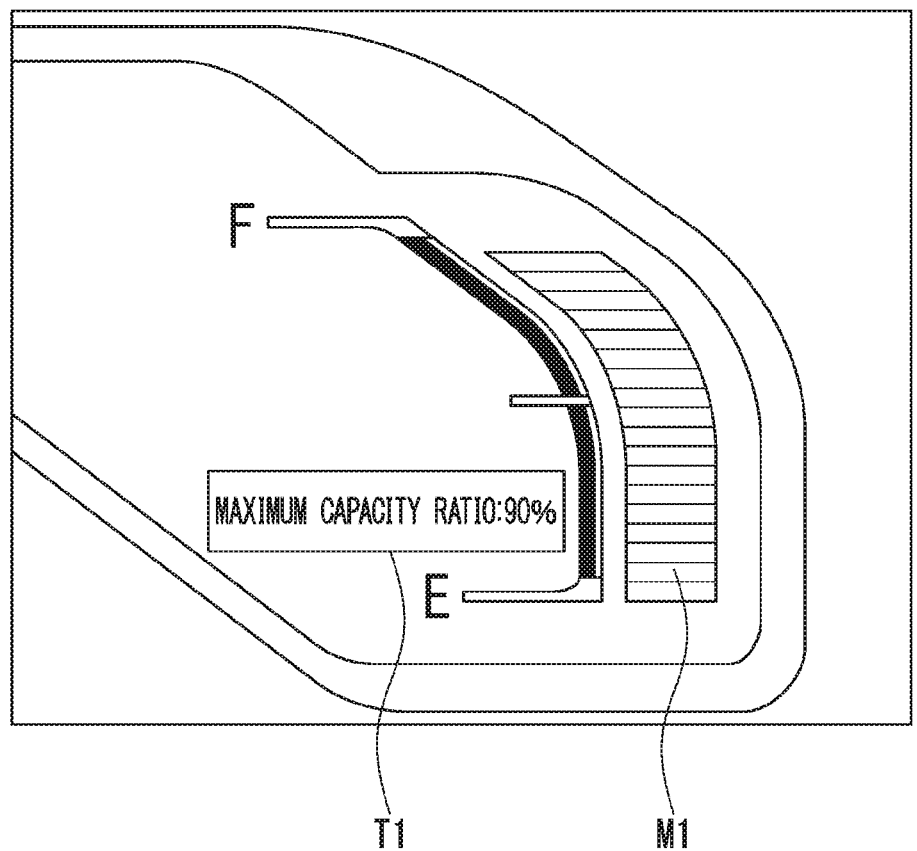
FIG. 3 is a view showing an example of a screen displayed on a display part.

FIG. 3 is a view showing an example of a screen displayed on the display part 62. As shown in FIG. 3, for example, a degradation state T1 of the battery 40 and a battery charging rate meter M1 are displayed on the display part 62. The degradation state is a ratio of the current full-charge capacity to the initial full-charge capacity (hereinafter, referred to as a "maximum capacity ratio"). That is, the degradation state represents a ratio of degradation of the current full-charge capacity relative to the initial full-charge capacity. The degradation state T1 is displayed using a numeral, and the battery charging rate meter M1 is displayed using a meter. For example, in FIG. 3, the degradation state T1 represents a state in which the current full-charge capacity is degraded by 10% relative to the initial full-charge capacity (the maximum capacity ratio is 90%). For example, the battery charging rate meter M1 indicates a value of "F" of the meter in a case where the secondary battery is fully charged (in a case where the charging rate is 100%). For example, the battery charging rate meter M1 indicates a value of "E" of the meter in a case where the secondary battery is fully discharged (in a case where the charging rate is 0%).

Figures 4, 5:
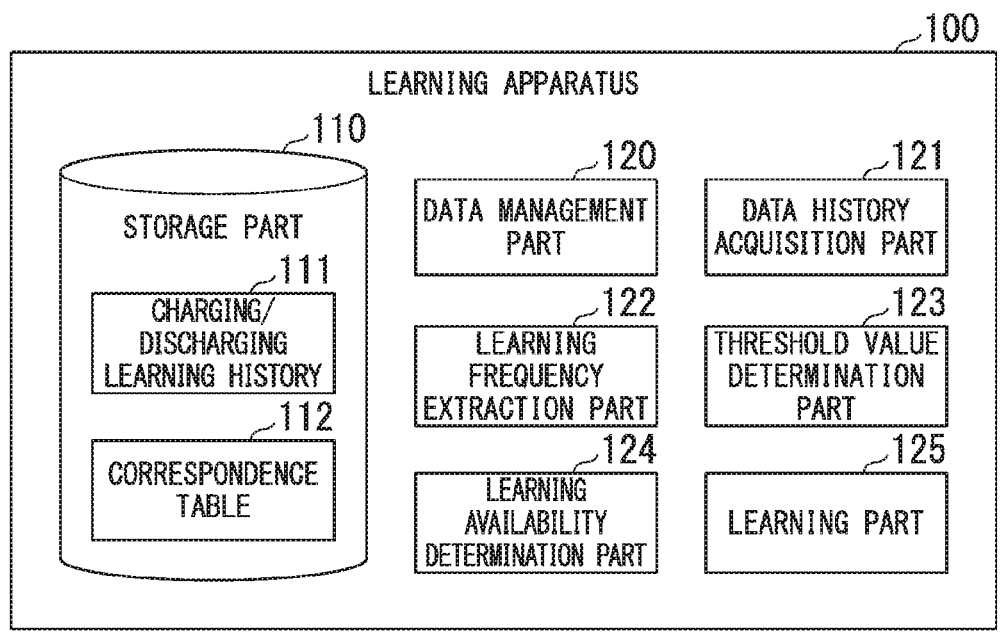
FIG. 4 is a block diagram showing a specific example of a function of a learning apparatus.
FIG. 5 is a view showing a specific example of a charging/discharging learning history.

FIG. 4 is a view showing an example of a function configuration of the learning apparatus 100. The learning apparatus 100 includes, for example, a storage part 110, a data management part 120, a data history acquisition part 121, a learning frequency extraction part 122, a threshold value determination part 123, a learning availability determination part 124 (determination part), and a learning part 125.

The storage part 110 is configured using a storage apparatus such as a magnetic hard disk apparatus or a semiconductor storage apparatus. The storage part 110 stores charging/discharging learning history 111 and a correspondence table 112.

Configuration elements other than the storage part 110 of the learning apparatus 100 are realized, for example, by a hardware processor such as a CPU (Central Processing Unit) executing a program (software). Some or all of such constituent elements may be realized by hardware (a circuit part; including circuitry) such as a LSI (Large-Scale Integration), an ASIC (Application-Specific Integrated Circuit), a FPGA (Field-Programmable Gate Array), or a GPU (Graphics-Processing Unit), or may be realized by software and hardware in cooperation. The program may be stored in advance in a storage apparatus (storage apparatus that includes a non-transitory storage medium) such as a HDD (Hard Disk Drive) or a flash memory, or may be stored in a removable storage medium (non-transitory storage medium) such as a DVD or a CD-ROM and installed by the storage medium attached to a drive apparatus. The learning apparatus 100 itself may be a software function of the control part 36.

The data management part 120 acquires a charging rate at a predetermined sampling cycle from the battery VCU control part and stores the acquired charging rate in the charging/discharging learning history 111. For example, the data management part 120 acquires data of a charging capacity and a charging rate of the battery 40 from the battery VCU control part at a one minute cycle and performs addition, update, and deleting of data to the charging/discharging learning history 111.

The data history acquisition part 121 acquires data of the charging/discharging learning history 111 in a predetermined period from the charging/discharging learning history 111. The data history acquisition part 121 transmits the acquired data to the learning frequency extraction part 122, the threshold value determination part 123, and the learning availability determination part 124. The predetermined period may be set in advance or may be arbitrarily determined by a user. The charging/discharging learning history 111 is described with reference to FIG. 5.

FIG. 5 is a view showing an example of the contents of the charging/discharging learning history 111. The charging/discharging learning history 111 is data history in which a charging rate, a charging/discharging current, and a learning flag are associated with a measurement time. The charging/discharging current is a current integration value of charging/discharging performed between a previous record and a current record. The learning flag is a flag that is given at each of a start time point and an end time point of data employed as the learning data. A flag "1" is given to a learning start time point, and a flag "2" is given to a learning end time point. The learning flag is given by the data management part 120.

The embodiment is described with reference to FIG. 4 again. The learning frequency extraction part 122 extracts a learning frequency (number of times of learning) in a first period T1. The first period is a period from a current time back to a predetermined time. The first period T1 is, for example, a period of about one week to one month. The learning frequency extraction part 122, for example, refers to the charging/discharging learning history 111 received from the data history acquisition part 121, counts the number of the learning flags "2" in the first period T1, and thereby extracts the learning frequency in a predetermined period.

The learning frequency extraction part 122 transmits the extracted frequency (hereinafter, referred to as an extraction learning frequency) to the threshold value determination part 123.

The threshold value determination part 123 refers to the correspondence table 112 by using the extraction learning frequency received from the learning frequency extraction part 122 and determines a threshold value with respect to a difference charging rate. The difference charging rate ($\Delta$SOC) is a charging rate indicating a difference between a maximum value of the charging rate and a minimum value of the charging rate in a predetermined period. The threshold value determination part 123 determines, as a threshold value used by the learning availability determination part 124, a threshold value associated with the extraction learning frequency in the correspondence table 112.

FIG. 6 is a view showing an example of the contents of the correspondence table 112 according to the embodiment. The correspondence table 112 is a table in which a threshold value is associated with a learning frequency. The learning frequency is information indicating the number of times the learning part 125 performs learning of the degradation state of the battery 40 using the learning data. The threshold value is a threshold value used by the learning availability determination part 124. The threshold value is determined to be increased as the learning frequency is increased. As a result, the threshold value determination part 123 determines a low threshold value in a case where the learning frequency is small in a predetermined period and determines a high threshold value in a case where the learning frequency is large.

The threshold value determination part 123 is able to increase the opportunity of learning (and the number of learning data) by determining a low threshold value and is able to acquire learning data with high accuracy by determining a high threshold value. Thereby, even in a case where the data management part 120 can acquire only data having a low difference charging rate, it is possible to lead the learning part 125 to actively perform the capacity learning.

The embodiment is described with reference to FIG. 4 again. The learning availability determination part 124 determines whether or not the data stored in the charging/discharging learning history 111 can be used as the learning data on the basis of the threshold value of the difference charging rate determined by the threshold value determination part 123. The learning availability determination part 124 extracts data in a second period from the data stored in the charging/discharging learning history 111. The second period is a period from a current time back to a predetermined time and is a shorter period than the first period. The second period is, for example, a period of about one day to several days.

The learning availability determination part 124 further classifies the data in the second period into scenes such as "during charging", "during pausing", and "during traveling" and obtains a maximum value and a minimum value of the charging rate in a scene. Then, in a case where a difference (difference charging rate) between the maximum value and the minimum value of the charging rate in at least one of the scenes exceeds the threshold value, the learning availability determination part 124 determines that data between the maximum value and the minimum value can be used as the learning data and transmits, as the learning data, the data to the learning part 125. The classifying of the second period into scenes may be omitted. In a case where the difference between the maximum value and the minimum value does not exceed the threshold value, the learning availability determination part 124 determines that the data in the second period cannot be used as the learning data.

The learning part 125 performs learning of the degradation state of the battery 40 on the basis of the learning data (the difference charging rate and the charging/discharging current) received from the learning availability determination part 124. In a case where the learning of the degradation state of the battery 40 is performed, the learning part 125 transmits a notification for updating the learning flag to the data management part 120. The data management part 120 changes the learning flag of the record of the maximum value of the charging rate in the predetermined period in the charging/discharging learning history 111 to "1" and changes the learning flag of the record of the minimum value of the charging rate in the predetermined period in the charging/discharging learning history 111 to "2".

The learning of the degradation state is described below. The learning part 125 calculates a current full-charge capacity (hereinafter, referred to as a "current maximum capacity") of the battery 40 on the basis of the learning data. The learning part 125 calculates a maximum capacity ratio (degradation state) of the current maximum capacity to the initial maximum capacity on the basis of the current maximum capacity and the initial maximum capacity. The initial maximum capacity is a full-charge capacity of the battery 40 at the time of shipping. The learning part 125 performs a statistical process such as a clustering process with respect to the calculated maximum capacity ratio. Thereby, the learning part 125 is able to learn the degradation state of the battery 40. The learning part 125 transmits the calculated maximum capacity ratio to the display control part 64. The display control part 64 allows the display part 62 to display the received maximum capacity ratio (for example, a display example of FIG. 3).

FIG. 7 is a view showing a specific example of the degradation state of the full-charge capacity of the battery 40 according to the embodiment. In FIG. 7, a solid line is a line indicating a true degradation state (true value) of the battery 40. In FIG. 7, a white circle is a calculation value of the maximum capacity ratio calculated by the learning part 125. In FIG. 7, a dotted line is a line indicating a maximum capacity ratio (learning value) obtained from the calculation values using a least-square method. The vertical axis represents a maximum capacity of the battery 40. The horizontal axis represents time. In FIG. 7, a case where the initial maximum capacity of the battery 40 at the time of shipping and the current maximum capacity are the same value is 100% of the maximum capacity ratio.

In FIG. 7, the calculation values are present along a time series, and therefore, the maximum capacity ratio on the basis of the calculation values is drawn as a two-dimensional graph. When the number of learning data is small (that is, the number of the calculation values is small), there may be cases in which the values obtained by the statistical process are dispersed, and the two-dimensional graph of the maximum capacity ratio cannot be successfully drawn. Therefore, by the threshold value determination part 123 determining the threshold value of the difference charging rate on the basis of the learning frequency, the learning part 125 is able to sufficiently ensure the number of learning data and is able to allow the learning value obtained by the statistical process to converge.

Figure 8:
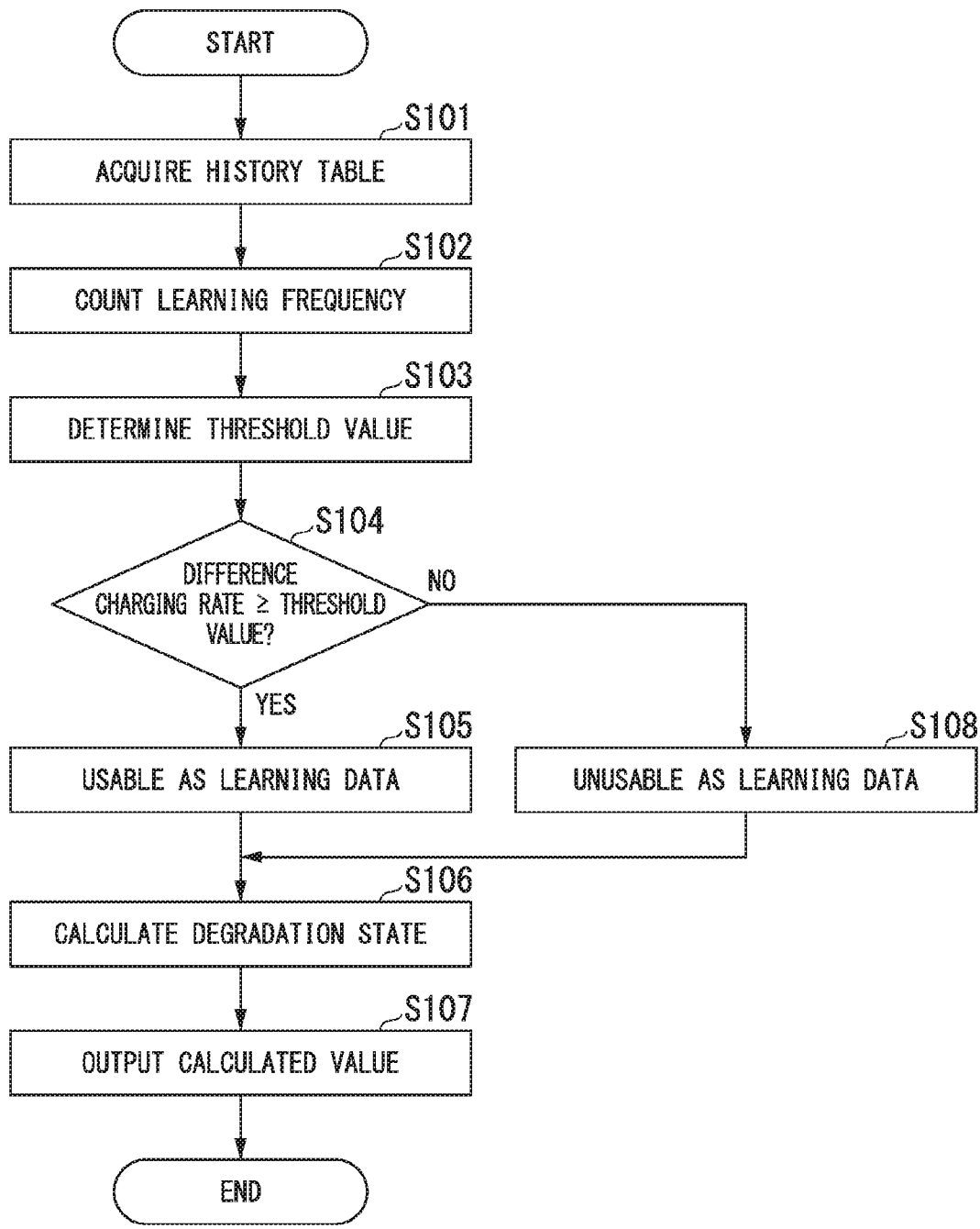
FIG. 8 is a flowchart showing a process flow of learning of the degradation state.

FIG. 8 is a flowchart showing a process flow of learning of the degradation state according to the embodiment. The flowchart of FIG. 8 is started, for example, when starting the engine (at the time of ignition-on).

First, the data history acquisition part 121 acquires data of the charging/discharging learning history 111 in a predetermined period from the charging/discharging learning history 111 (Step S101). Next, the learning frequency extraction part 122 counts how many times the learning is performed in the first period on the basis of the learning flag stored in the charging/discharging learning history 111. The learning frequency extraction part 122 extracts the counted learning frequency as an extraction learning frequency in the predetermined period (Step S102).

Next, the threshold value determination part 123 refers to the correspondence table 112 by using the extraction learning frequency received from the learning frequency extraction part 122 and determines a threshold value of the difference charging rate (Step S103). Next, the learning availability determination part 124 determines whether or not the difference charging rate of the record given by the learning flag stored in the charging/discharging learning history 111 can be used as the learning data on the basis of the threshold value of the difference charging rate determined by the threshold value determination part 123 (Step S104).

In a case where the difference charging rate exceeds the threshold value determined by the threshold value determination part 123 (Step S104: YES), the learning availability determination part 124 determines that data between the maximum value and the minimum value of the charging rate in the second period can be used as the learning data (Step S105). The learning availability determination part 124 transmits, as the learning data, the difference charging rate and the record of the charging/discharging current between the maximum and minimum values of the charging/discharging learning history 111 to the learning part 125. The learning part 125 calculates the current maximum capacity of the current battery 40 on the basis of the learning data ($\Delta SOC$ and $\Delta Ah$). Next, the learning part 125 calculates a maximum capacity ratio (degradation state) of the current maximum capacity to the initial maximum capacity on the basis of the current maximum capacity and the initial maximum capacity (Step S106).

The learning part 125 transmits the calculated maximum capacity ratio to the display control part 64. Next, the display control part 64 allows the display part 62 to display the received maximum capacity ratio (Step S107). In a case where the difference charging rate does not exceed the threshold value determined by the threshold value determination part 123 (Step S104: NO), the learning availability determination part 124 determines that the data in the second period cannot be used as the learning data (Step S108). Next, the processes of Step S106 and Step S107 are performed.

According to the learning apparatus 100 configured in this way, by having the threshold value determination part 123 and the learning part 125, it is possible to determine the threshold value of the difference charging rate on the basis of the learning frequency in the second period. The threshold value determination part 123 refers to the correspondence table 112 by using the learning frequency extracted from the charging/discharging learning history 111 and determines the threshold value of the difference charging rate. The threshold value determination part 123 is able to determine a low threshold value in a case where the learning frequency in the second period is small and is able to determine a high threshold value in a case where the learning frequency in the second period is large. The learning part 125 performs learning of the degradation state of the battery 40 on the basis of the difference charging rate as the learning data. Thereby, the learning apparatus 100 is able to fairly ensure the learning opportunity of the degradation state of the secondary battery.

Modified Example

The data history acquisition part 121 may acquire the difference charging rate and the number of learning data used for learning from the charging/discharging learning history 111. That is, the charging/discharging learning history 111 may have a column of a learning data flag. The learning data flag may be given by the data management part 120. The charging/discharging learning history 111 may store a record used as the learning data as "1" and store a record not used as the learning data as "0" regardless of being learned by the learning part 125 or not. Then the threshold value determination part 123 may determine the threshold value relating to the difference charging rate on the basis of the number of the learning data.

When receiving the learning data from the learning availability determination part 124, the learning part 125 may not perform learning of the degradation state of the battery 40 immediately. That is, the learning part 125 may start learning of the degradation state of the battery 40 in a case where learning data of a predetermined number or more are acquired.

FIG. 9 is a data table showing an example of the contents of the correspondence table 112 according to a modified example.

The contents described in FIG. 6 are appropriately omitted.

The storage part 110 stores, for example, the correspondence table 112 shown in FIG. 9 in advance. The correspondence table 112 is a table in which a threshold value and a data reflection rate are associated with a learning frequency.

The data reflection rate is information indicating the degree of reflection of the maximum capacity ratio calculated by the learning part 125 when learning the degradation state. As the data reflection rate, a predetermined reflection rate is set on the basis of the learning frequency. For example, in a case where the learning frequency in the second period is small, since the opportunity of learning is insufficient, the data reflection rate is set to be high. For example, in a case where the learning frequency in the second period is large, since the learning data is sufficient, the data reflection rate is set to be low. The data reflection rate set in accordance with the learning frequency may be set in advance or may be arbitrarily set by a user.

The threshold value may be determined using a $\Delta OCV$, a stabilization time, and an average current in place of the learning frequency. The $\Delta OCV$ is a voltage of the battery 40. The stabilization time is information indicating a time period in which the battery 40 is in a stable state before and after charging/discharging. The average current is a current of the battery 40. For example, the threshold value determination part 123 may determine the threshold value such that the threshold value increases as the $\Delta OCV$ increases. For example, the threshold value determination part 123 may determine the threshold value such that the threshold value is larger as the stabilization time increases. For example, the threshold value determination part 123 may determine the threshold value such that the threshold value increases as the average current increases.

The ΔOCV, the stabilization time, and the average current set in accordance with the learning frequency may be set in advance or may be arbitrarily set by a user. By using the ΔOCV, the stabilization time, and the average current, even when the learning frequency is not extracted by the learning frequency extraction part 122, the threshold value determination part 123 is able to determine the threshold value.

FIG. 10 is a data table showing an example of the contents of the correspondence table 112 according to the modified example. The contents described in FIG. 6 are appropriately omitted.

The storage part 110 stores, for example, the correspondence table 112 shown in FIG. 10 in advance. The correspondence table 112 is generated on the basis of information of the threshold value and a square sum of the difference charging rate. The square sum of the difference charging rate is a value obtained by integrating square values of difference charging rates.

The learning availability determination part 124 may determine whether or not the difference charging rate stored in the correspondence table 112 can be used as the learning data on the basis of the square sum of the difference charging rate in place of the learning frequency. When the square sum of the difference charging rate is larger than a predetermined value, the learning availability determination part 124 transmits, as the learning data, the difference charging rate of a record to be a target to the learning part 125. When the square sum of the difference charging rate is smaller than the predetermined value, the learning availability determination part 124 discards and does not use, as the learning data, the difference charging rate of the record to be the target.

Thereby, by using the correspondence table 112 of FIG. 10, even when the learning frequency is not extracted by the learning frequency extraction part 122, and even when the threshold value is not determined by the threshold value determination part 123, the learning part 125 is able to perform learning.

Although the embodiment of the present invention has been described, the invention is not limited to the embodiment, and a variety of modifications and replacements can be made without departing from the scope of the invention.

What is claimed is:

1. A learning apparatus, comprising:
   a learning part that performs, based on charging/discharging data indicating at least one of charging and discharging of a secondary battery that supplies electric power for traveling of a vehicle, a capacity learning of the secondary battery and that performs the capacity learning in response to a change amount of a charging rate that is indicated by the charging/discharging data exceeding a threshold value; and
   a threshold determination part that determines the threshold value based on history information of the learning part performing the capacity learning in a predetermined period,
   wherein the history information is a number of times the learning part performs the capacity learning in the predetermined period.

2. The learning apparatus according to claim 1,
   wherein the history information is an integration value of a difference charging rate that indicates a difference between a maximum value of a charging rate and a minimum value of the charging rate in the predetermined period in a history of the learning part performing the capacity learning in the predetermined period.

3. The learning apparatus according to claim 2,
   wherein the threshold determination part makes the threshold value smaller as the integration value of the difference charging rate becomes smaller.

4. The learning apparatus according to claim 1,
   wherein the history information is a square sum of a difference charging rate that indicates a difference between a maximum value of a charging rate and a minimum value of the charging rate in the predetermined period in a history of the learning part performing the capacity learning in the predetermined period.

5. The learning apparatus according to claim 4,
   wherein the threshold determination part makes the threshold value smaller as the square sum of the difference charging rate becomes smaller.

6. The learning apparatus according to claim 1,
   wherein the threshold determination part makes the threshold value smaller as the number of times becomes smaller.

7. The learning apparatus according to claim 1, further comprising:
   a determination part that determines whether the charging/discharging data is used as learning data of the capacity learning based on the threshold value,
   wherein the learning part performs the capacity learning using the learning data based on a determination result of the determination part.

8. The learning apparatus according to claim 1, further comprising:
   a display control part that allows a display part to display a degradation degree of the secondary battery based on a result of the capacity learning.

9. The learning apparatus according to claim 1,
   wherein the learning part compares a current maximum capacity indicating a current full-charge capacity of the secondary battery to an initial maximum capacity indicating an initial full-charge capacity of the secondary battery and calculates a ratio of the full-charge capacity indicating a degradation degree of the current full-charge capacity to the initial maximum capacity.

10. A learning apparatus, comprising:
    a learning part that performs, based on charging/discharging data indicating at least one of charging and discharging of a secondary battery that supplies electric power for traveling of a vehicle, a capacity learning of the secondary battery and that performs the capacity learning in response to an average current that is indicated by the charging/discharging data exceeding a threshold value; and
    a threshold determination part that determines the threshold value based on history information of the learning part performing the capacity learning in a predetermined period,
    wherein the history information is a number of times the learning part performs the capacity learning in the predetermined period.

11. A learning apparatus, comprising:
    a learning part that performs, based on charging/discharging data indicating at least one of charging and discharging of a secondary battery that supplies electric power for traveling of a vehicle, a capacity learning of the secondary battery and that performs the capacity learning in response to a change amount of a battery voltage that is indicated by the charging/discharging data exceeding a threshold value; and a threshold determination part that determines the threshold value based on history information of the learning part performing the capacity learning in a predetermined period,
wherein the history information is a number of times the learning part performs the capacity learning in the predetermined period.

12. A learning method, by way of one or more computers, comprising:
performing, based on charging/discharging data indicating at least one of charging and discharging of a secondary battery that supplies electric power for traveling of a vehicle, a capacity learning of the secondary battery;
performing the capacity learning in response to a change amount of a charging rate that is indicated by the charging/discharging data exceeding a threshold value; and
determining the threshold value based on history information of performing the capacity learning in a predetermined period,
wherein the history information is a number of times for which the capacity learning is performed in the predetermined period.

13. A learning method, by way of one or more computers, comprising:
performing, based on charging/discharging data indicating at least one of charging and discharging of a secondary battery that supplies electric power for traveling of a vehicle, a capacity learning of the secondary battery;
performing the capacity learning in response to an average current that is indicated by the charging/discharging data exceeding a threshold value; and
determining the threshold value based on history information of performing the capacity learning in a predetermined period,
wherein the history information is a number of times for which the capacity learning is performed in the predetermined period.

14. A learning method, by way of one or more computers, comprising:
performing, based on charging/discharging data indicating at least one of charging and discharging of a secondary battery that supplies electric power for traveling of a vehicle, a capacity learning of the secondary battery;
performing the capacity learning in response to a change amount of a battery voltage that is indicated by the charging/discharging data exceeding a threshold value; and
determining the threshold value based on history information of performing the capacity learning in a predetermined period,
wherein the history information is a number of times for which the capacity learning is performed in the predetermined period.

15. A computer-readable non-transitory recording medium including a program causing one or more computers to execute:
performing, based on charging/discharging data indicating at least one of charging and discharging of a secondary battery that supplies electric power for traveling of a vehicle, a capacity learning of the secondary battery;
performing the capacity learning in response to a change amount of a charging rate that is indicated by the charging/discharging data exceeding a threshold value; and
determining the threshold value based on history information of performing the capacity learning in a predetermined period,
wherein the history information is a number of times for which the capacity learning is performed in the predetermined period.

16. A computer-readable non-transitory recording medium including a program causing one or more computers to execute:
performing, based on charging/discharging data indicating at least one of charging and discharging of a secondary battery that supplies electric power for traveling of a vehicle, a capacity learning of the secondary battery;
performing the capacity learning in response to an average current that is indicated by the charging/discharging data exceeding a threshold value; and
determining the threshold value based on history information of performing the capacity learning in a predetermined period,
wherein the history information is a number of times for which the capacity learning is performed in the predetermined period.

17. A computer-readable non-transitory recording medium including a program causing one or more computers to execute:
performing, based on charging/discharging data indicating at least one of charging and discharging of a secondary battery that supplies electric power for traveling of a vehicle, a capacity learning of the secondary battery;
performing the capacity learning in response to a change amount of a battery voltage that is indicated by the charging/discharging data exceeding a threshold value; and
determining the threshold value based on history information of performing the capacity learning in a predetermined period,
wherein the history information is a number of times for which the capacity learning is performed in the predetermined period.

* * * * *